June 1, 1948. W. J. JACOBSSON 2,442,414
BLOWPIPE HEAD
Filed March 2, 1940
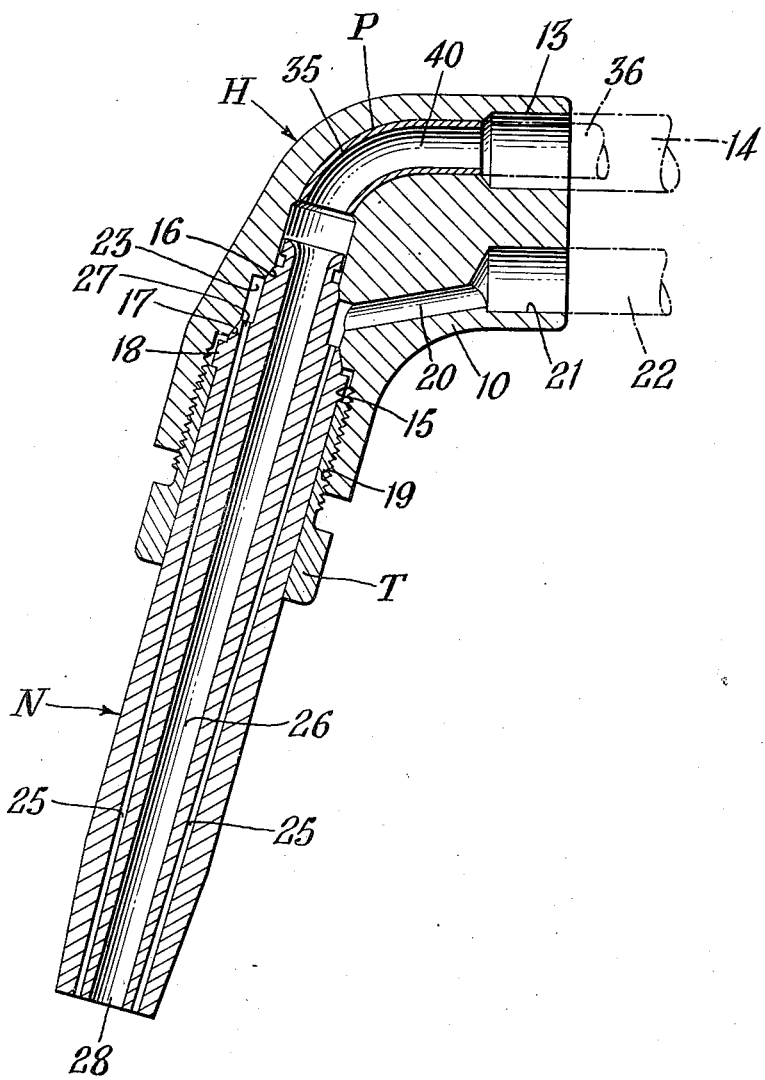
INVENTOR
WILGOT J. JACOBSSON
ATTORNEY Patented June 1, 1948

2,442,414

UNITED STATES PATENT OFFICE 2,442,414

BLOWPIPE HEAD

Wilgot J. Jacobsson, Plainfield, N. J., assignor to The Linde Air Products Company, a corporation of Ohio Application March 2, 1940, Serial No. 321,817

2 Claims. (Cl. 158—27.4)

This invention relates to blowpipes and particularly to improved blowpipe heads and a method of making the same.

In blowpipes, the efficiency of the flame or of the cutting-oxygen jet is lowered by turbulence and the resulting friction in the gas stream and the effect of turbulence is especially noticeable in the oxidizing gas streams of cutting, deseaming, and similar blowpipes. Manually manipulated cutting and deseaming blowpipes are provided with a nozzle-retaining head having gas passages which usually abruptly change the direction of gas flow and, in the past, it has been customary to manufacture economically such a blowpipe head from a single piece of copper, bronze, or other corrosion-resistant metal, and to form therethrough a gas passage or passages by drilling from opposite ends of the head. At the intersection of these drillings, the walls of the gas passage are not smooth and continuous and the gas passage makes an abrupt angle turn, all of which causes turbulence and friction in the gas stream and a drop in its cutting efficiency.

I have found that when the oxygen supply passage immediately ahead of and leading directly to the inlet end of the oxygen passage through the nozzle is provided with a smooth sweeping curve ending in axial alignment with the entrance of the axial passage through the nozzle, an unexpected and material increase in metal removing efficiency is obtained when all the other factors affecting the efficiency are maintained the same. Tests have shown that a material increase of efficiency is obtained by substituting a smoothly curved oxygen supply passage for the customary drilled and angular oxygen passage in a blowpipe head or other similar body which usually is coupled to the deseaming nozzle to supply cutting oxygen thereto. For example, it has been found that under certain conditions a hand-deseaming blowpipe having the customary intersecting drilled passages in the blowpipe head requires 3.1 cubic feet of oxygen to remove one pound of metal from the surface of a ferrous body, whereas by using a head having a smoothly curved passage instead of one having the usual intersecting drilled passages, only 2.4 cubic feet of oxygen is required to remove a pound of metal. The oxygen pressure, the preheating gas pressure, the size of the passages and the angle through which the direction of gas flow was changed, all remained constant for these tests.

Accordingly, an object of this invention is to provide a more efficient blowpipe including a blowpipe head having a gas passage formed therethrough with smooth, continuous walls and without an abrupt angle turn so as to eliminate turbulence in the gas flowing through this passage.

Other objects of this invention include the provision of a blowpipe head that is light in weight to reduce the effort involved in manipulating the blowpipe; and the provision of a blowpipe head that is essentially of a unitary construction and economical to manufacture. According to the present invention, the blowpipe head for use in cutting or deseaming metal has a cavity therein provided with an inlet portion and an outlet portion disposed at an angle to each other. The inlet portion of this cavity is adapted to receive cutting or deseaming oxygen and the outlet portion is adapted to receive a metal cutting or deseaming nozzle. A preformed tube in this cavity has its ends fitting said inlet and outlet portions respectively and extending therebetween for conveying cutting or deseaming oxygen to said nozzle. Said tube has a smooth and continuous inner surface and is gradually curved for changing the direction of the cutting or deseaming oxygen stream flowing therethrough. Preferably the blowpipe head comprises a layer of moldable material contacting the outer curved surface of said tube, and the moldable material has an outer surface curved similarly to said passage in the plane of curvature and thereby uniformly spaced from said passage.

The above and other objects and novel features of this invention will become apparent from the following specification and the accompanying drawing, in which:

The single figure is a longitudinal sectional view of a blowpipe head and a deseaming nozzle coupled thereto, showing one embodiment of the invention.

The principles of this invention may be embodied in any cutting or deseaming blowpipe head. Referring more particularly to the drawing, the principles of this invention are shown as being embodied in the head H of a conventional hand-operated deseaming blowpipe, such as is disclosed in United States Patent No. 1,957,351 to Samuel R. Oldham, May 1, 1934. The head H is adapted to operatively receive a deseaming nozzle N, which is removably retained in the head by a nut T. A gas passage P is formed in the head H, and has smooth, continuous walls and is so curved that it does not abruptly change the direction of gas flow. The gas stream delivered to the inlet of the nozzle N is free from turbulence and thermochemically deseams the work surface at maximum efficiency.

The inlet end of passage P is enlarged at 13 to receive an end portion of the blowpipe cutting-oxygen supply tube 14, which is secured thereto by silver solder or other suitable means. The outlet end of passage P is enlarged to provide a socket 15, to operatively receive the inlet end of the deseaming nozzle N. Seating surfaces 16 and 17 are provided in socket 15 which are engaged by corresponding seats on the rear end of the nozzle N. Nozzle N is removably secured to the blowpipe head by means of the nut T which threadedly engages the internally threaded portion 19 of the socket 15. The inner end of nut T engages the underside of a shoulder 18 on the nozzle to retain the nozzle in the socket, and to tightly press the seats on the nozzle against the surfaces 16 and 17 to hermetically seal these joints.

The body 10 also contains a combustible gas passage 20 communicating with cavity 21 and adapted to receive the end of combustible gas conveying tube 22 which may be fastened therein by silver solder or other suitable means. Passage 20 has an outlet orifice discharging into a chamber 23 between the seating surfaces 16 and 17.

Passage 20 is shown as a straight passage which may be formed by drilling or other suitable means. This is an economical construction for it has been determined that it is not as necessary that the preheating gas passage 20 be formed with a smooth, continuous surface and without an abrupt angle turn, as the passage P is formed.

In nozzle N there are a plurality of combustible gas passages or preheating gas passages 25 usually disposed substantially parallel to the central cutting oxygen passage or bore 26 for discharging preheating flames onto the work surface to raise it to the oxygen ignition temperature. The preheating gas passages 25 have inlet orifices 27 opening into the chamber 23. The seating surface 16 and the corresponding seat on the nozzle form a gas-tight seal to prevent cutting oxygen from escaping from passage P into chamber 23, and the seating surface 17 and the corresponding nozzle seat form a gas-tight seal preventing the escape of combustible gas to the atmosphere.

The cutting oxygen is supplied to tube 14 through the usual control valve of the blowpipe (not shown) and flows from tube 14 through passage P and the central bore 26 of nozzle N to the outlet orifice 28. As shown, the longitudinal axis of the nozzle bore 26 is at approximately an angle of 70 degrees to the axis of the oxygen supply tube 14, and passage P is gradually curved and has a smooth, continuous wall so that, even though the direction of oxygen flow is changed considerably, the turbulence, friction and loss of velocity of the flowing but confined gas stream are reduced to a minimum, whereby the oxygen jet issuing from the nozzle orifice efficiently reacts with the ferrous metal, i. e., a cubic foot of oxygen thermochemically removes a greater weight of ferrous metal in the form of a molten slag mixture.

The combustible gas mixture of oxygen and acetylene is supplied to tube 22 from an appropriate mixer in the blowpipe (not shown) and flows from tube 22 through passage 20, distributing chamber 23 and the preheating gas passages 25 of nozzle N and against the work to provide a flame of sufficient intensity to raise that portion of the surface against which the cutting oxygen impinges to the oxygen ignition temperature.

It is preferable that the radius of curvature for the portion of passage P immediately preceding the inlet orifice of the cutting oxygen bore 26 should be not less than one and one-half times the diameter of passage P. If the radius of curvature is increased, the turbulence will be decreased. The radius of curvature is taken as equal to the distance of the longitudinal axis of passage P from the imaginary center of the curve or bend. The arrangement of the passage P and the seating surfaces 16 and 17 is such that the longitudinal axis of the central oxygen bore 26 of the nozzle N, and also the axis of the cavity or socket 15 for receiving the rear end of the nozzle, is tangent to the longitudinal axis of passage P at the inlet of the oxygen bore 26 of the nozzle. Furthermore, as shown in Figure 1, the diameter of the curved head passage 11 preferably is materially greater than the diameter of the nozzle passage 26.

The following table compares the amounts of oxygen consumed by hand-deseaming blowpipes constructed according to the present invention as compared to a hand-deseaming blowpipe having the usual intersecting gas passages in the blowpipe head, the diameter of the oxidizing gas passage in the blowpipe head being .344 inch for all blowpipes and the angle through which the direction of gas flow is changed being 75 degrees in all cases:

|  | Radius of Curve in Inches | Ratio of Radius of Curve to Diameter of Passage | Cubic Feet of O₂ Required to Remove One Pound of Metal | Percent Decrease in O₂ Consumed |
|---|---|---|---|---|
| Intersecting Drilled Passages | | | 3.1 | |
| Curved Passages | .518 | 1.5 | 2.9 | 6.5 |
| | .562 | 1.63 | 2.7 | 13 |
| | .673 | 1.95 | 2.4 | 22.5 |

Thus, by forming passage P with a radius of curvature one and one-half times the diameter of passage P, the oxygen consumed in removing one pound of metal is reduced to 2.9 cubic feet as compared to the 3.1 cubic feet of oxygen consumed when using a blowpipe head containing the usual, intersecting drilled passages. By increasing the radius of curvature of passage P to 1.95 times the diameter, the oxygen consumption is reduced to 2.4 cubic feet for each pound of metal removed.

Referring more particularly to the body 10, a preformed tube 35, which may be of suitable metal such as copper, is placed in the mold and the mold is then filled with molten bronze or other relatively machinable corrosion-resistant metal. The tube 35 may extend through and project beyond the rear of the body casting 10, as shown by broken lines at 36. In the blowpipe head as thus formed, the space between the outer curved surface of the tube 35 is filled with a layer of moldable material comprising the metal of which the body 10 is cast. Thus this layer of moldable material contacts the outer curved surface of the tube 35, and has an outer surface which is the outer surface of the body 10, and which is curved similarly to the passage in the tube 35 in the plane of curvature and thereby spaced from said passage.

The tube 35 has the proper diameter and preferably is gradually and smoothly curved, as shown, before being placed in the mold so that the resulting cutting oxygen passage 40 formed in the head by the tube will have smooth, continuous walls and is so curved that it will not abruptly change the direction of gas flow. The oxidizing gas flows from tube 14 through passage 40 to the oxygen bore 26 extending through nozzle N and the turbulence, friction and loss of velocity is reduced to a minimum.

While I have described and illustrated only the preferred embodiment of my invention, it will be apparent to those skilled in the art that various changes, modifications, substitutions, additions, and omissions may be made without departing from the spirit and scope of the invention as set forth by the claims. Divisional subject matter originally disclosed in this application has been divided out and presented in my copending application Serial No. 748,033, filed May 14, 1947.

What is claimed is:

1. For use in a blowpipe for cutting or deseaming ferrous metal, a blowpipe head having a cavity therein provided with an inlet portion and an outlet portion disposed at an angle to each other, said inlet portion being adapted to receive cutting or deseaming oxygen and said outlet portion being adapted to receive a metal cutting or deseaming nozzle, and a preformed tube in said cavity having its ends fitting said inlet and outlet portions respectively and extending therebetween for conveying cutting or deseaming oxygen to said nozzle, said tube having a smooth and continuous inner surface and being gradually curved for changing the direction of the cutting or deseaming oxygen stream flowing therethrough.

2. A blowpipe head as claimed in claim 1, comprising a layer of moldable material contacting the outer curved surface of said tube, said moldable material having an outer surface curved similarly to said passage in the plane of curvature and thereby uniformly spaced from said passage.

WILGOT J. JACOBSSON.

REFERENCES CITED

The following references are of record in the file of this patent:

UNITED STATES PATENTS

| Number | Name | Date |
|---|---|---|
| 1,032,431 | Rosen-Baum | July 16, 1912 |
| 1,072,436 | Dicks | Sept. 9, 1913 |
| 1,147,018 | Hansen | July 20, 1915 |
| 1,195,298 | Vuilleumier | Aug. 22, 1916 |
| 1,234,878 | Corvin | July 31, 1917 |
| 1,310,099 | Walker | July 15, 1919 |
| 1,434,047 | DeBats | Oct. 31, 1922 |
| 1,439,937 | Bacon | Dec. 26, 1922 |
| 1,468,807 | Gooch | Sept. 25, 1923 |
| 1,655,172 | Weber | Jan. 3, 1928 |
| 1,659,279 | Morrison | Feb. 14, 1928 |
| 1,776,364 | Miller | Sept. 23, 1930 |
| 1,958,085 | Hammon | May 8, 1934 |
| 1,958,741 | Campbell | May 15, 1934 |
| 1,982,055 | Jenkins | Nov. 27, 1934 |
| 1,989,996 | Mautsch | Feb. 5, 1935 |
| 1,999,599 | Smith | Apr. 30, 1935 |
| 2,029,154 | Campbell | Jan. 28, 1936 |
| 2,117,751 | Walker | May 17, 1938 |
| 2,119,056 | Peterson | May 31, 1938 |
| 2,136,899 | Weaver | Nov. 15, 1938 |
| 2,157,269 | Richter | May 9, 1939 |
| 2,175,160 | Zobel et al. | Oct. 3, 1939 |
| 2,176,773 | Sparkes | Oct. 17, 1939 |
| 2,181,135 | Kehl | Nov. 28, 1939 |
| 2,200,259 | Bucknam et al. | May 14, 1940 |
| 2,294,392 | Egger | Sept. 1, 1942 |

FOREIGN PATENTS

| Number | Country | Date |
|---|---|---|
| 59,748 | Sweden | Mar. 14, 1919 |

OTHER REFERENCES

"Welding Encyclopedia," 8th edition, 1932, Welding Engineer Publishing Company, Chicago, Illinois. Section on "Hard Facing," pages 91 to 96.